United States Patent
Fujii (10) Patent No.: US 12,405,602 B2
(45) Date of Patent: Sep. 2, 2025

(54) INFORMATION PROCESSING APPARATUS, INFORMATION PROCESSING SYSTEM, AND INFORMATION PROCESSING METHOD

(71) Applicant: Hitachi, Ltd., Tokyo (JP)

(72) Inventor: Norisuke Fujii, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 456 days.

(21) Appl. No.: 17/984,567

(22) Filed: Nov. 10, 2022

(65) Prior Publication Data

US 2023/0229147 A1   Jul. 20, 2023

(30) Foreign Application Priority Data

Jan. 20, 2022 (JP) .................. 2022-006932

(51) Int. Cl.
  *G05B 19/418* (2006.01)
  *G06T 11/20* (2006.01)
(52) U.S. Cl.
  CPC ...... *G05B 19/41865* (2013.01); *G06T 11/206* (2013.01); *G05B 2219/32281* (2013.01)
(58) Field of Classification Search
  CPC .... G05B 19/41865; G05B 2219/32281; G06T 11/206
  See application file for complete search history.

(56) References Cited

U.S. PATENT DOCUMENTS

2017/0199518 A1* 7/2017 Stoeckel .......... G05B 19/41885
2019/0129387 A1* 5/2019 Mohanty .............. G06Q 10/063

FOREIGN PATENT DOCUMENTS

JP       2021-68010 A    4/2021

* cited by examiner

*Primary Examiner* — Gary Collins
(74) *Attorney, Agent, or Firm* — Crowell & Moring LLP (57) ABSTRACT

Even if there is no similar record of plan generation for a manufacturing line, a logic of production scheduling is appropriately configured. An information processing apparatus stores a graph showing a manufacturing line configured to manufacture a plurality of items, task information indicating graphs showing basic modules and tasks of production scheduling, and a rule for selecting a logic of the production scheduling based on the tasks, identifies graphs showing basic modules included in the graph showing the manufacturing line by referring to the task information, extracts tasks corresponding to the identified graphs of the basic modules, selects a logic corresponding to the extracted tasks by referring to the rule, and outputs information indicating the selected logic.

11 Claims, 8 Drawing Sheets

| PROCESS FLOW INFORMATION | | | | |
|---|---|---|---|---|
| ITEM | PROCESS NUMBER | PROCESS | USE RESOURCE | |
| A | 1 | BENDING | BENDING MACHINE a | |
| A | 1 | BENDING | BENDING MACHINE b | |
| A | 1 | BENDING | BENDING MACHINE c | |
| A | 1 | BENDING | BENDING MACHINE d | |
| B | 1 | CUTTING | PROCESSING MACHINE | |
| B | 2 | BENDING | BENDING MACHINE a | |
| B | 3 | ASSEMBLING | WORKER | |
| B | 4 | PAINTING | PAINTING EQUIPMENT | |

| BASIC MODULE INFORMATION | | |
|---|---|---|
| BASIC MODULE ID | GRAPH | TASK |
| 1 | ... | DELIVERY TIME MARGIN PRIORITY |
| 2 | ... | PROCESSING TIME PRIORITY |
| ... | ... | ... |

INFORMATION PROCESSING APPARATUS, INFORMATION PROCESSING SYSTEM, AND INFORMATION PROCESSING METHOD

CLAIM OF PRIORITY

The present application claims priority from Japanese patent application JP 2022-006932 filed on Jan. 20, 2022, the content of which is hereby incorporated by reference into this application.

BACKGROUND OF THE INVENTION

1. Field of the Invention

The present invention relates to an information processing apparatus, an information processing system, and an information processing method.

2. Description of the Related Art

Examples of the related art of the field of the invention include JP-A-2021-68010 (Patent Literature 1). This publication discloses that "a mathematical model representing a feature of a plan that has been generated and used before implementation of a plan generation system in a factory where the system is to be constructed from now on is compared with a mathematical model corresponding to processing of a source code that is created when the plan generation system is already constructed in another factory, and when it is determined that the mathematical models are the same, a past source code corresponding to the mathematical model is reused" (see the abstract).

In the technique disclosed in Patent Literature 1, the number of man-hours for source code development is reduced by reusing the source code created in the past of the plan generation system, but it is not possible to cope with plan generation of a new case having no similar record in the past. In addition, since there are innumerable process flows in a manufacturing line in a factory and there are innumerable logics for production scheduling corresponding to the process flows, there are many cases having no similar record in the past.

SUMMARY OF THE INVENTION

Therefore, an aspect of the present invention appropriately configures a logic of production scheduling even if there is no similar record of plan generation for a manufacturing line.

In order to solve the above problems, an aspect of the present invention adopts the following configuration. An information processing apparatus includes a processor and a memory. The memory stores a graph showing a manufacturing line configured to manufacture a plurality of items, task information indicating graphs showing basic modules and tasks of production scheduling, and a rule for selecting a logic of the production scheduling based on the tasks. The processor identifies graphs showing basic modules included in the graph showing the manufacturing line by referring to the task information, extracts tasks corresponding to the identified graphs of the basic modules by referring to the task information, selects a logic corresponding to the extracted tasks by referring to the rule, and outputs information indicating the selected logic.

Advantageous Effects

According to an aspect of the present invention, a logic of production scheduling is appropriately configured even if there is no similar record of plan generation for a manufacturing line.

Problems, configurations, and effects other than those described above will be clarified in the description of the following embodiment.

DESCRIPTION OF THE PREFERRED EMBODIMENTS

Hereinafter, an embodiment of the invention will be described in detail with reference to the drawings. In the present embodiment, the same components are denoted by the same reference signs in principle, and a repeated description thereof will be omitted. Note that the present embodiment is merely an example for implementing the present invention and does not limit the technical scope of the present invention.

First Embodiment

Figure 1:
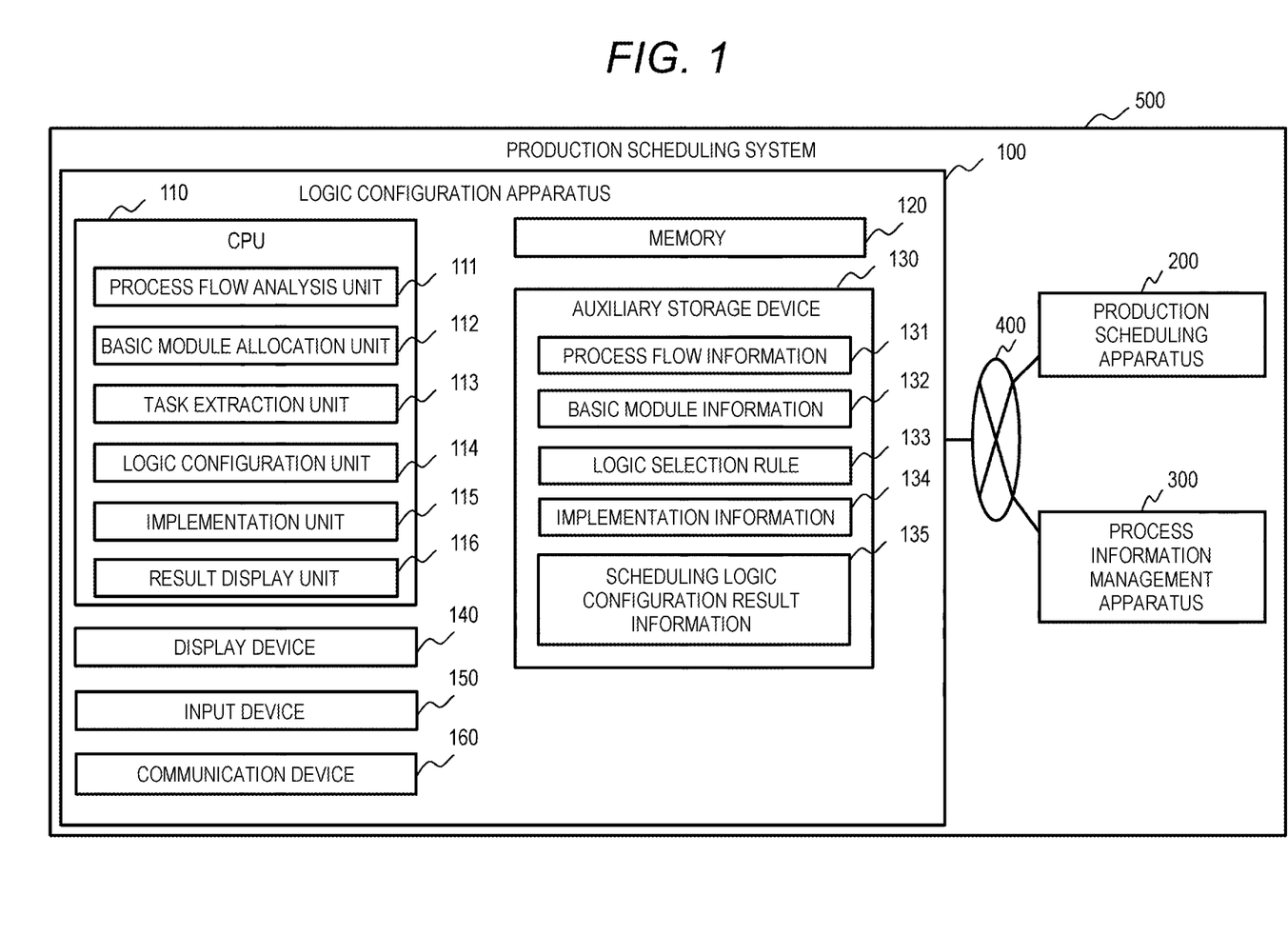
FIG. 1 is a block diagram illustrating a configuration example of a production scheduling system according to a first embodiment.

FIG. 1 is a block diagram illustrating a configuration example of a production scheduling system. A production scheduling system 500 includes, for example, a logic configuration apparatus 100, a production scheduling apparatus 200, and a process information management apparatus 300, which are connected via a network 400 such as the Internet.

The process information management apparatus 300 stores a process flow (a series of processes including one or more processes) for product production for each item, and transmits the process flow to the logic configuration apparatus 100. The logic configuration apparatus 100 configures a logic for production scheduling for producing items, based on the process flow for each item received from the process information management apparatus 300, and transmits implementation information for implementing the configured logic to the production scheduling apparatus 200. The logic configuration apparatus 100 may receive an input of information indicating process flows of items from a user of the logic configuration apparatus 100.

The production scheduling apparatus 200 formulates a production schedule for items based on the logic indicated by the implementation information received from the logic configuration apparatus 100. The production scheduling apparatus 200 stores delivery times of products of items and processing time required to produce the products of the items.

The logic configuration apparatus 100 is implemented by, for example, a computer including a central processing unit (CPU) 110, a memory 120, an auxiliary storage device 130, a display device 140, an input device 150, and a communication device 160.

The CPU 110 includes a processor and executes a program stored in the memory 120. The memory 120 includes a read only memory (ROM), which is a nonvolatile storage element, and a random access memory (RAM), which is a volatile storage element. The ROM stores an invariable program (for example, a basic input/output system (BIOS)) and the like. The RAM is a high-speed and volatile storage element such as a dynamic random access memory (DRAM), and temporarily stores a program to be executed by the CPU 110 and data to be used when the program is executed.

The auxiliary storage device 130 is, for example, a large-capacity and non-volatile storage device such as a magnetic storage device (hard disk drive (HDD)) or a flash memory (solid state drive (SSD)), and stores a program to be executed by the CPU 110 and data to be used when the program is executed. That is, the program is read from the auxiliary storage device 130, loaded into the memory 120, and executed by the CPU 110.

The display device 140 is a device such as a display or a printer that outputs an execution result of a program in a form that can be visually recognized by an operator. The input device 150 is a device such as a keyboard or a mouse that receives an input from the operator.

The communication device 160 is a network interface device that controls communication with other devices according to a predetermined protocol. The communication device 160 may include a serial interface such as a universal serial bus (USB).

A part or all of the programs executed by the CPU 110 may be provided to the logic configuration apparatus 100 via a removable medium (CD-ROM, flash memory, or the like) that is a non-transitory storage medium, or from an external computer including a non-transitory storage device via a network, and may be stored in the non-volatile auxiliary storage device 130 that is a non-transitory storage medium. Therefore, the logic configuration apparatus 100 may have an interface for reading data from a removable medium. The same applies to the production scheduling apparatus 200 and the process information management apparatus 300.

The logic configuration apparatus 100 is a computer system implemented on a physically single computer or implemented on a plurality of logically or physically constituted computers, and may operate in separate threads on the same computer or may operate on a virtual computer constructed on a plurality of physical computer resources. The same applies to the production scheduling apparatus 200 and the process information management apparatus 300. At least two of the logic configuration apparatus 100, the production scheduling apparatus 200, and the process information management apparatus 300 may be integrated.

The CPU 110 includes, for example, a process flow analysis unit 111, a basic module allocation unit 112, a task extraction unit 113, a logic configuration unit 114, an implementation unit 115, and a result display unit 116. The process flow analysis unit 111 analyzes process flows of items and generates a graph showing a manufacturing line for manufacturing all items. The basic module allocation unit 112 identifies basic modules included in the graph showing the manufacturing line.

The task extraction unit 113 extracts scheduling-related tasks corresponding to the identified basic modules. The logic configuration unit 114 selects a logic based on the extracted tasks. The implementation unit 115 generates data for implementing the selected logic on the production scheduling apparatus 200. The result display unit 116 displays, on the display device 140, execution results of programs executed by functional units.

For example, the CPU 110 functions as the process flow analysis unit 111 by operating according to a process flow analysis program loaded into the memory 120, and functions as the basic module allocation unit 112 by operating according to a basic module allocation program loaded into the memory 120. The relationship between a program and a functional unit applies to the other functional units provided in the CPU 110.

A part or all of the functions of the functional units provided in the CPU 110 may be implemented using hardware such as an application specific integrated circuit (ASIC) or a field-programmable gate array (FPGA).

The auxiliary storage device 130 stores, for example, process flow information 131, basic module information 132, a logic selection rule 133, implementation information 134, and scheduling logic configuration result information 135.

The process flow information 131 indicates a process flow for manufacturing products of items. The basic module information 132 indicates a graph of a basic module and a task corresponding to the basic module. The logic selection rule 133 is a rule for selecting a logic based on a task. The implementation information 134 includes information for implementing a logic on the production scheduling apparatus 200 (information indicating specifications of the production scheduling apparatus 200). The scheduling logic configuration result information 135 indicates a selected logic.

A part or all pieces of the information stored in the auxiliary storage device 130 may be stored in the memory 120, may be stored in the production scheduling apparatus 200 or the process information management apparatus 300, or may be stored in an external database connected to the production scheduling system 500.

In the present embodiment, information used by a data management system does not depend on a data structure and may be expressed in any data structure. For example, a data structure appropriately selected from a table, a list, a database, and a queue can store information.

Figure 2:
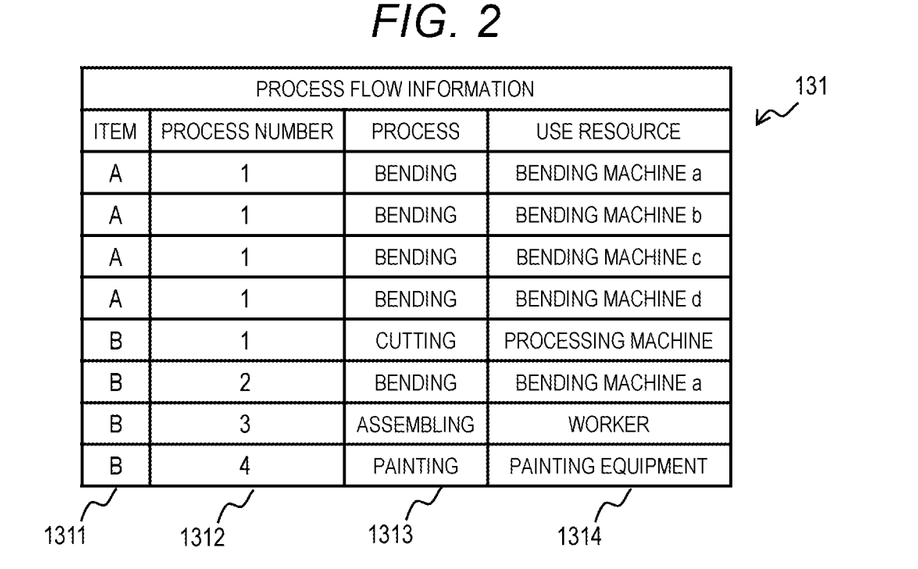
FIG. 2 is a table illustrating an example of process flow information according to the first embodiment.

FIG. 2 is a table illustrating an example of the process flow information 131. The process flow information 131 includes, for example, an item field 1311, a process number field 1312, a process field 1313, and a use resource field 1314. The item field 1311 holds information for identifying an item of a product. The process number field 1312 holds a process number indicating an order of processes for producing products. The process field 1313 holds information for identifying a process. The use resource field 1314 holds information indicating a use resource that is a resource used in the process.

In the example in FIG. 2, in order to manufacture a product of an item B, it is necessary to perform a "cutting" process using a "processing machine" corresponding to a process number "1", a "bending" process using a "bending machine a" corresponding to a process number "2", an "assembling" process by a "worker" corresponding to a process number "3", and a "painting" process using a piece of "painting equipment" corresponding to a process number "4" in the order of the process numbers.

In the process flow information 131, a plurality of records having the same process number of the same item may be stored. In this case, any one of the processes indicated by the plurality of records having the same process number of the same item may be performed. In the example in FIG. 2, the "bending" process using any one of the "bending machine a", a "bending machine b", a "bending machine c", and a "bending machine d" is performed, whereby a product of an item A can be manufactured.

Figure 3:
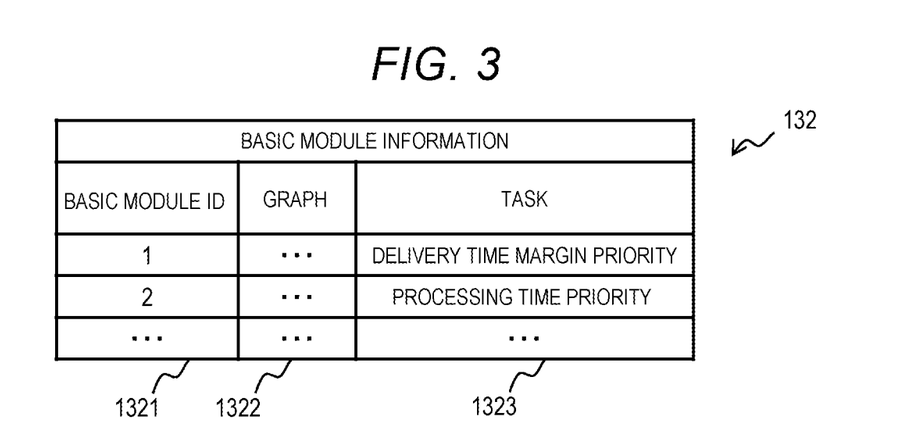
FIG. 3 is a table illustrating an example of basic module information according to the first embodiment.

FIG. 3 is a table illustrating an example of the basic module information 132. The basic module information 132 includes, for example, a basic module ID field 1321, a graph field 1322, and a task field 1323. The basic module ID field 1321 holds an ID for identifying a basic module. The graph field 1322 holds information for identifying a directed graph that is a basic module. Specifically, for example, the graph field 1322 holds an adjacency matrix, a connection matrix, or a Laplacian matrix of a directed graph. The task field 1323 holds information indicating a task corresponding to a basic module.

The "delivery time margin priority", which is a task corresponding to a basic module having a basic module ID of "1", is a task indicating that production of a product of an item having a large (or small) delivery time margin (the number of remaining days until the delivery time/processing time required to produce the product of the item) is preferentially started. The "processing time priority", which is a task corresponding to a basic module having a basic module ID of "2", is a task indicating that production of a product of an item requiring a short (or long) processing time for product production is preferentially started. The same task may correspond to different basic modules in the basic module information 132.

Figure 4:
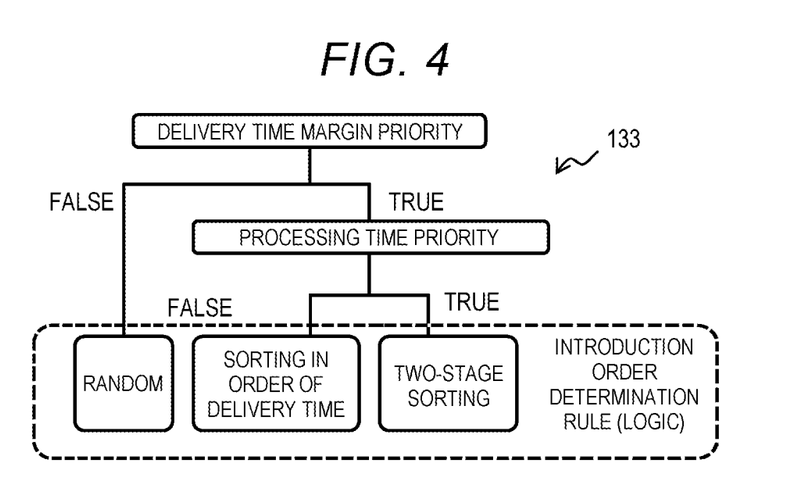
FIG. 4 is a diagram illustrating an example of a logic selection rule according to the first embodiment.

FIG. 4 is a diagram illustrating an example of the logic selection rule 133. The logic selection rule 133 is a rule for selecting a logic based on a task, and is defined by, for example, an if statement having an obtained task as a condition. In the example in FIG. 4, "random" is selected as a logic when "delivery time margin priority" is not obtained as a task, "sorting in order of delivery time" is selected as a logic when "delivery time margin priority" is obtained as a task and "shortest processing time priority" is not obtained as a task, and "two-stage sorting" is selected as a logic when "delivery time margin priority" is obtained as a task and "shortest processing time priority" is obtained as a task.

"Random" indicates that an introduction order of products of items (that is, an order in which production is started) is random. "Sorting in order of delivery time" indicates that an introduction order of the products of the items is an order from the nearest delivery time to the farthest delivery time (or a reverse order from the farthest delivery time to the nearest delivery time). The "two-stage sorting" indicates that an introduction order of the products of the items is an order in which the products of the items are sorted in an order from the nearest delivery time to the farthest delivery time (or a reverse order from the farthest delivery time to the nearest delivery time), and further products of items having the same delivery time are sorted in an ascending order (or in a descending order) of the processing time. Alternatively, the "two-stage sorting" indicates that an introduction order of the products of the items is an order in which the products of the items are sorted in an ascending order (or in a descending order) of the processing time, and further products of items having the same processing time are sorted in an order from the nearest delivery time to the farthest delivery time (or a reverse order from the farthest delivery time to the nearest delivery time).

Although the logic selection rule 133 is defined by a simple if statement in the example in FIG. 4, the logic selection rule 133 may be defined by a predetermined probabilistic model that receives an obtained task and outputs a logic. In addition, for example, the model may be subjected to learning by giving a correct logic for the obtained task by a user. In addition, the logic selection rule 133 may be programmed in a program that implements the logic configuration unit 114 without being stored in the auxiliary storage device 130.

Figure 5:
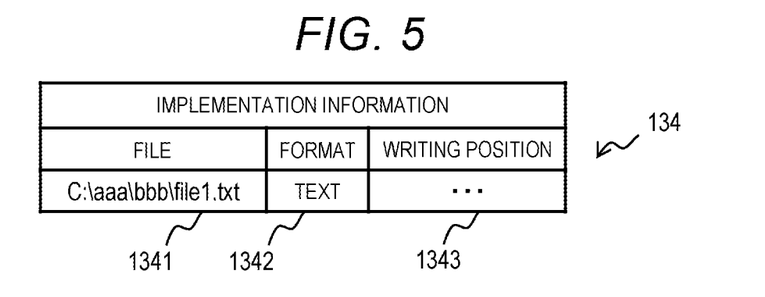
FIG. 5 is a table illustrating an example of implementation information according to the first embodiment.

FIG. 5 is a table illustrating an example of the implementation information 134. The implementation information 134 includes, for example, a file field 1341, a format field 1342, and a writing position field 1343. The file field 1341 holds information indicating a storage location and a file name of a file to which a logic is to be written. The information is held by the production scheduling apparatus 200. The format field 1342 holds information indicating a format of the file indicated by the file field 1341. The writing position field 1343 holds information indicating a position in the file indicated by the file field 1341 where the logic is to be written.

Figure 6:
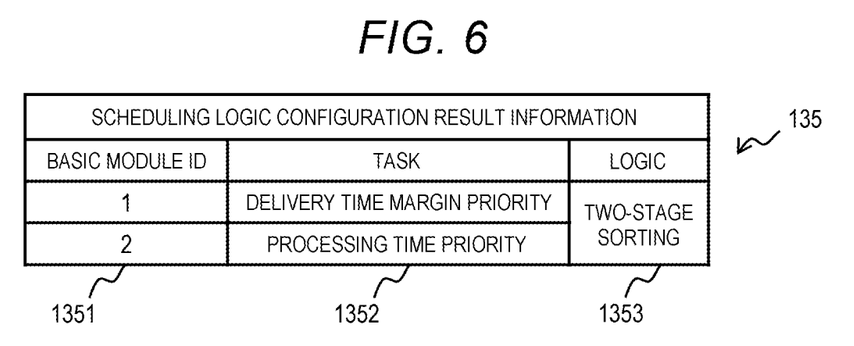
FIG. 6 is a table illustrating an example of scheduling logic configuration result information according to the first embodiment.

FIG. 6 is a table illustrating an example of the scheduling logic configuration result information 135. The scheduling logic configuration result information 135 includes, for example, a basic module ID field 1351, a task field 1352, and a logic field 1353. The basic module ID field 1351 holds a basic module ID allocated by the basic module allocation unit 112. The task field 1352 holds information indicating a task extracted by the task extraction unit 113. The logic field 1353 holds information indicating a logic selected by the logic configuration unit 114.

Figure 7:
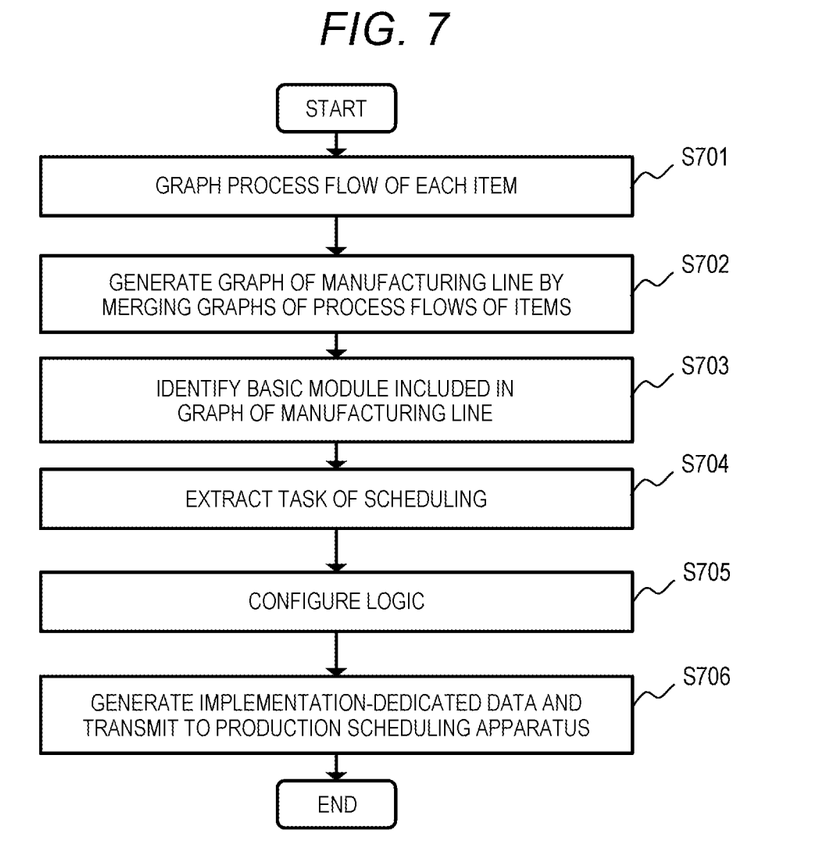
FIG. 7 is a flowchart illustrating an example of logic configuration processing performed by a logic configuration apparatus according to the first embodiment.

FIG. 7 is a flowchart illustrating an example of logic configuration processing performed by the logic configuration apparatus 100. It is assumed that the process flow information 131, the basic module information 132, the logic selection rule 133, and the implementation information 134 are set before the logic configuration processing is started. The process flow analysis unit 111 refers to the process flow information 131 and graphs process flows of items (S701). Specifically, for example, for each item of the process flow information 131, the process flow analysis unit 111 acquires a record, and generates a directed graph (by, for example, a graph representation method in the graph field 1322 of the basic module information 132) in which each of use resources indicated by the record is set as a node, and in which connection of a use resource of a previous process indicated by a process number to a use resource of a subsequent process is set as an edge (an edge directed from the node indicating the use resource of the previous process to the node indicating the use resource of the subsequent process).

The process flow analysis unit 111 merges directed graphs indicating the process flows of the items generated in step S701 to generate a directed graph showing a manufacturing line for producing all the items (S702). In addition, the processing of step 5701 and step 5702 may be omitted, that is, the logic configuration apparatus 100 may receive the graph of the manufacturing line from the process information management apparatus 300 in advance.

Figure 8:
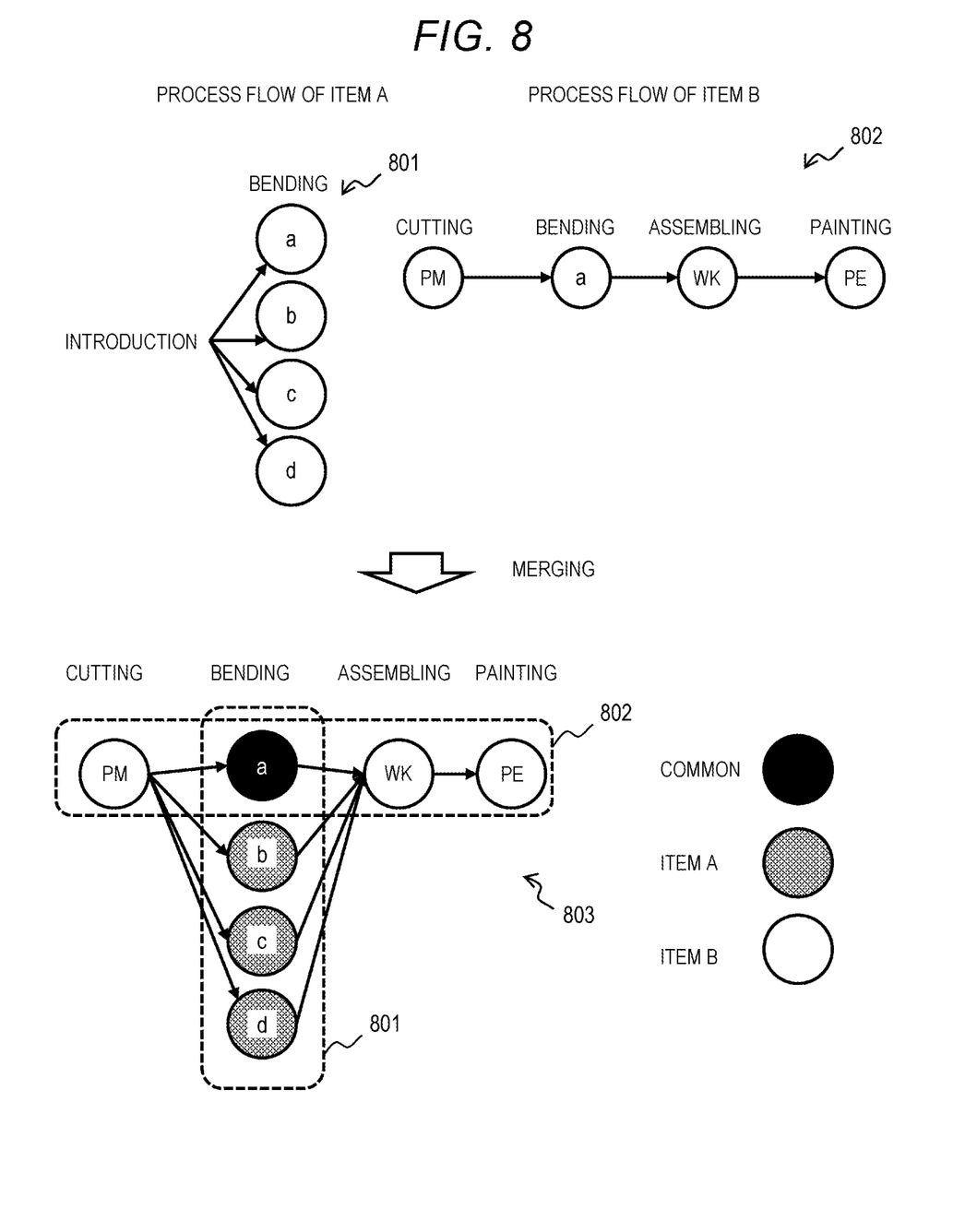
FIG. 8 is an explanatory diagram illustrating an outline of graphing of process flows and merging processing of graphs of the process flows according to the first embodiment.

FIG. 8 is an explanatory diagram illustrating an outline of the graphing of the process flows in step 5701 and the merging processing of the graphs of the process flows in step S702. A graph 801 is a directed graph showing a process flow of the item A indicated by the process flow information 131 in FIG. 2, and a graph 802 is a directed graph showing a process flow of the item B indicated by the process flow information 131 in FIG. 2.

In FIG. 8, a node "a" indicates a "bending machine a", a node "b" indicates a "bending machine b", a node "c" indicates a "bending machine c", a node "d" indicates a "bending machine d", a node "PM" indicates a "processing machine", a node "WK" indicates a "worker", and a node "PE" indicates a piece of "painting equipment".

The process flow analysis unit 111 assigns an edge (a start point is not defined), which has a resource of each process as an end point, to a process flow having only one process number such as the process flow in the graph 801 of the process flow of the item A.

When the process flow analysis unit 111 determines that there are a plurality of process flows that include a common process by referring to the process flow information 131, the process flow analysis unit 111 merges graphs of the plurality of process flows to generate a graph showing a manufacturing line including the graphs of the plurality of process flows.

Specifically, for example, for a plurality of graphs including a common process, the process flow analysis unit 111 generates a graph showing a manufacturing line by connecting, with an edge (the edge is directed from an earlier process to a later process), nodes corresponding to a use resource of the common process and nodes corresponding to a use resource of one process immediately before the common process and a use resource of one process immediately after the common process in a graph of another process flow.

In the example in FIG. 8, the process flow analysis unit 111 merges the graph 801 of the process flow of the item A and the graph 802 of the process flow of the item B to generate a graph 803 indicating a manufacturing line for manufacturing the item A and the item B. The graph 803 is a graph obtained by merging via "bending", which is a process commonly included in the process flow indicated by the graph 801 and the process flow indicated by the graph 802, and includes the graph 801 and the graph 801. Note that both the graph 801 and the graph 802 include the node indicating the "bending machine a", but in the graph 803 obtained by the merging, overlapping nodes are expressed as one node (that is, the graph 803 includes only one node of the "bending machine a").

Note that the process flow analysis unit 111 does not merge graphs of process flows that do not include a common process, and treats the graphs as separate manufacturing lines. That is, when there are a plurality of process flows that do not include a common process, the process flow analysis unit 111 generates a plurality of directed graphs indicating manufacturing lines.

In the example described above, when it is determined that there are a plurality of process flows including a common process, the process flow analysis unit 111 generates a graph showing a manufacturing line and including graphs of the plurality of process flows. Alternatively, only when it is determined that there are a plurality of process flows including a common process and a common use resource, the process flow analysis unit 111 may generate a graph showing a manufacturing line and including graphs of the plurality of process flows. That is, in this case, the process flow analysis unit 111 does not merge graphs of process flows that do not include a common process and a common use resource, and treats the graph as separate manufacturing lines.

Return to the description of FIG. 7. Subsequently, the basic module allocation unit 112 identifies basic modules (graphs) included in the directed graph of the manufacturing line by referring to the basic module information 132 (S703). Specifically, for example, the basic module allocation unit 112 identifies the basic modules (graphs) included in the directed graph of the manufacturing line by solving a subset covering problem in which the basic modules are subgraphs. The basic module allocation unit 112 stores basic module IDs of the identified basic modules in the scheduling logic configuration result information 135.

The task extraction unit 113 extracts tasks corresponding to the basic module IDs identified in step 5703 from the basic module information 132, and stores the extracted tasks in the scheduling logic configuration result information 135 (S704).

Figure 9:
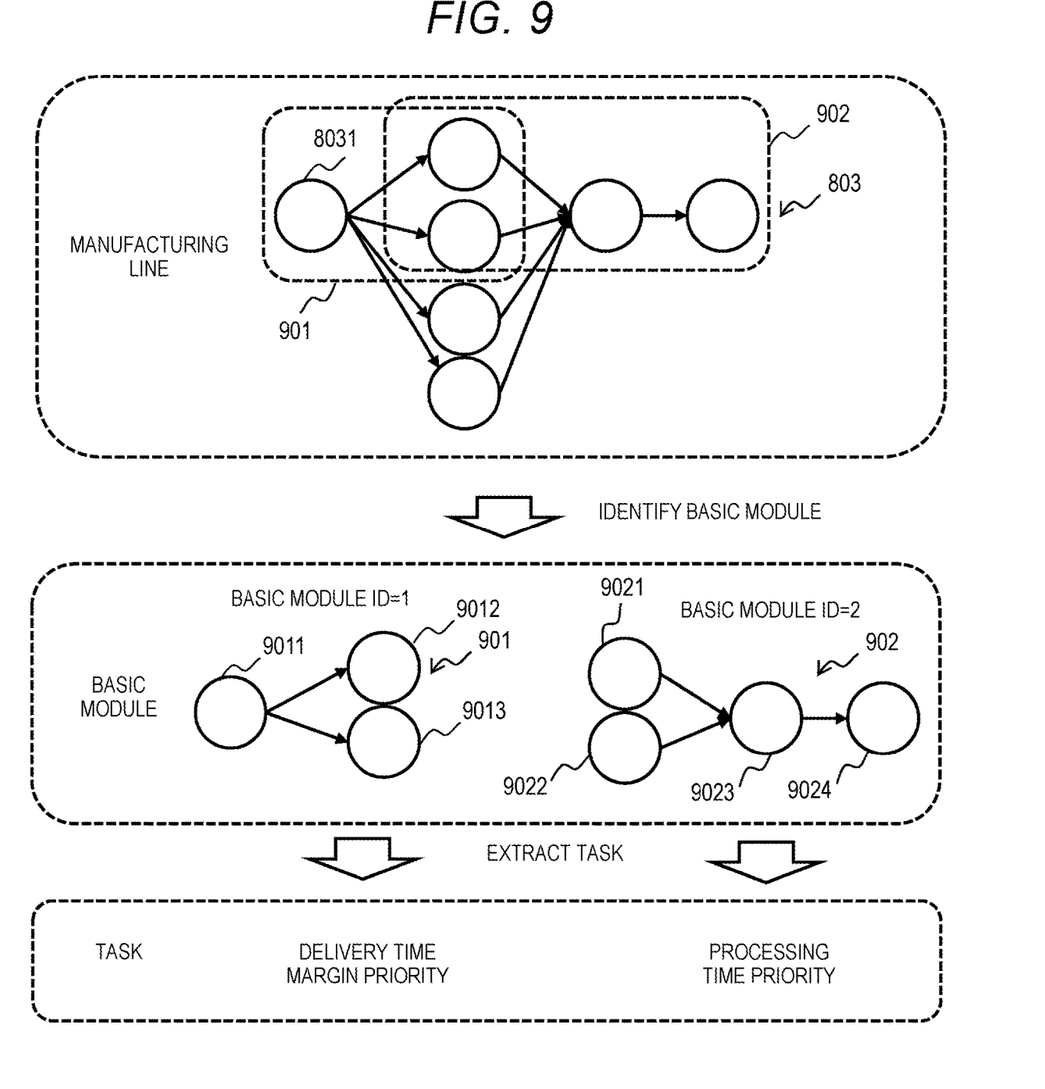
FIG. 9 is an explanatory diagram illustrating an outline of basic module identifying processing and task extraction processing according to the first embodiment.

FIG. 9 is an explanatory diagram illustrating an outline of the basic module identifying processing in step 5703 and the task extraction processing in step 5704. In the example in FIG. 9, a basic module 901 with a basic module ID "1" is a directed graph that includes a node 9011, a node 9012, and a node 9013 and that includes an edge directed from the node 9011 to the node 9012 and an edge directed from the node 9011 to the node 9013.

In the example in FIG. 9, a basic module 902 with a basic module ID "2" is a directed graph that includes a node 9021, a node 9022, a node 9023, and a node 9024 and that includes an edge directed from the node 9021 to the node 9023, an edge directed from the node 9022 to the node 9023, and an edge directed from the node 9023 to the node 9024.

In the example in FIG. 9, since the graph 803 indicating the manufacturing line includes the basic module 901 and the basic module 902, the basic module allocation unit 112 identifies the basic module 901 and the basic module 902.

The basic module allocation unit 112 may not necessarily extract all the basic modules included in the graph 803 indicating the manufacturing line. Specifically, for example, a priority order of the basic modules may be determined in advance in the basic module information 132, and the basic module allocation unit 112 may extract basic modules included in the graph 803 indicating the manufacturing line according to the priority order, for example, with a predetermined number as an upper limit.

In the example in FIG. 9, a node 8031 is connected to four nodes in the graph 803 indicating the manufacturing line, but since the basic module 901 is included as a part of (matches with a part of) the graph 803, in such a case, the basic module allocation unit 112 determines that the basic module 901 is included in the graph 803. The basic module allocation unit 112 may determine that the graph showing the manufacturing line includes a basic module only when it is determined that the graph showing the manufacturing line includes a portion completely matching the basic module.

In the example in FIG. 9, in the basic module information 132, a task corresponding to the basic module 901 is "delivery time margin priority" and a task corresponding to the basic module 902 is "processing time priority", and thus the task extraction unit 113 extracts "delivery time margin priority" and "processing time priority" as tasks.

Return to the description of FIG. 7. Subsequently, the logic configuration unit 114 selects a logic corresponding to the extracted task according to the logic selection rule 133, and stores the selected logic in the scheduling logic configuration result information 135 (S705).

The logic configuration unit 114 may display the extracted task and the selected logic on the display device 140, and a user of the logic configuration apparatus 100 may input a correct logic via the input device 150. When the logic configuration unit 114 determines that the selected logic and the correct logic are different from each other, the logic configuration unit 114 may learn the logic selection rule 133 based on the extracted task and the correct logic. Further, in this case, the logic configuration unit 114 stores the input correct logic in the logic field 1353 of the scheduling logic configuration result information 135.

The implementation unit 115 generates implementation-dedicated data (S706), transmits the generated implementation-dedicated data to the production scheduling apparatus 200, and ends the logic configuration processing. Specifically, for example, the implementation unit 115 includes a record of the scheduling logic configuration result information 135 and a file name, a format, and a writing position indicated by the implementation information 134 in the implementation-dedicated data.

The production scheduling apparatus 200 writes the logic indicated by a record of the scheduling logic configuration result information 135 into a file indicated by the received implementation-dedicated data (that is, implements the logic), and formulates a production schedule of the items based on the logic, delivery time of the products of the items (as necessary), and processing time required to produce the products of the items.

The result display unit 116 may display a display screen and a detailed result display screen, which will be described later, on the display device 140 according to the execution of the processing in FIG. 7.

In the above example, an example has been described in which the basic module, the process flow, and the manufacturing line are represented by a directed graph. Alternatively, the basic module, the process flow, and the manufacturing line may be represented by an undirected graph (the edge of the graph in the above example may be an undirected edge).

Figure 10:
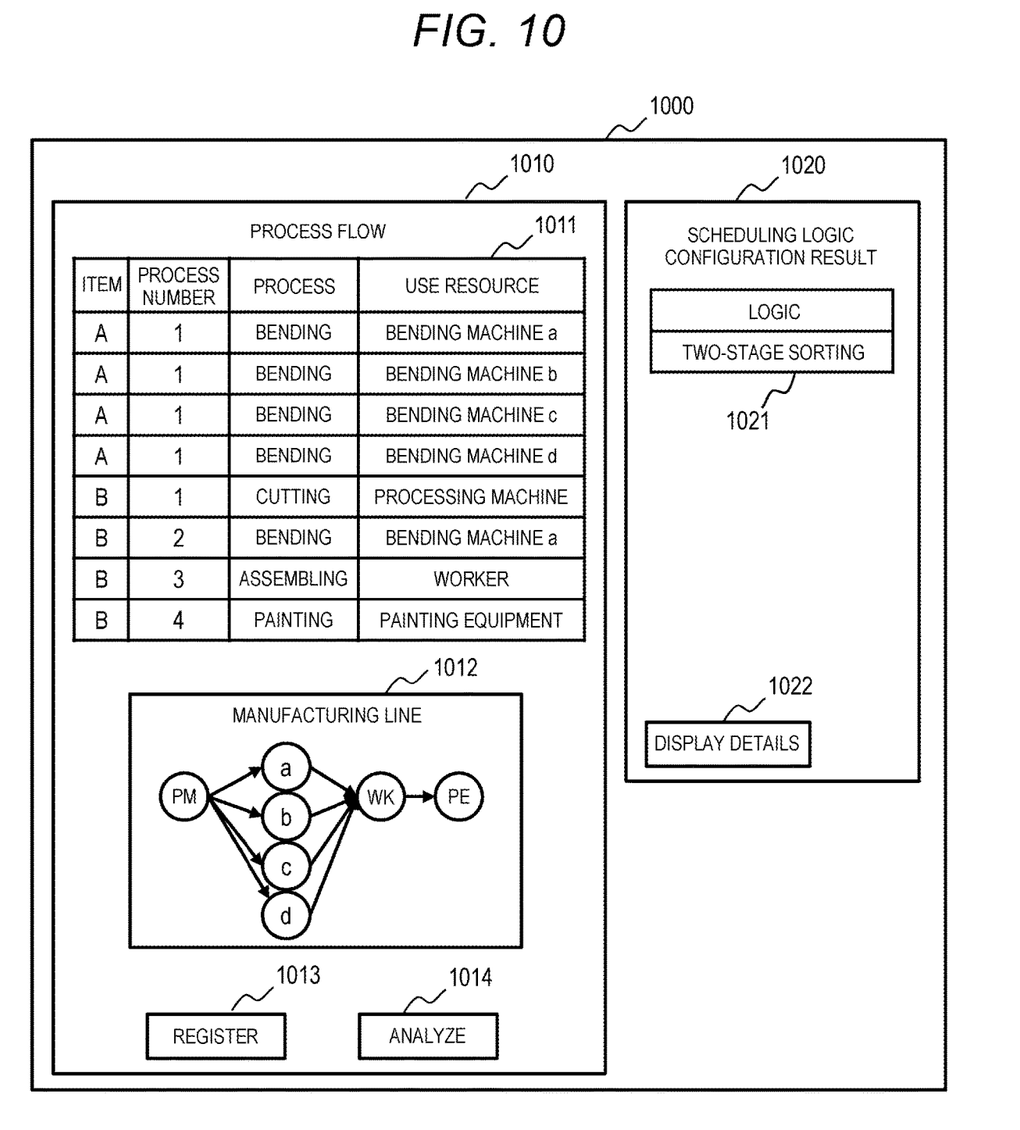
FIG. 10 is a diagram illustrating an example of a display screen displayed on a display device of the logic configuration apparatus according to the first embodiment.

FIG. 10 is an example of a display screen displayed on the display device 140 of the logic configuration apparatus 100. A display screen 1000 includes, for example, a process flow display area 1010 and a scheduling logic configuration result display area 1020. The display screen 1000 may be displayed on a display device provided in the production scheduling apparatus 200.

The process flow display area 1010 includes, for example, a process flow information input area 1011, a manufacturing line display area 1012, a registration button 1013, and an analysis button 1014. The scheduling logic configuration result display area 1020 includes, for example, a logic display area 1021 and a detail display button 1022.

The process flow information input area 1011 is an area for the user of the logic configuration apparatus 100 to input a process flow via the input device 150. When the registration button 1013 is selected, the process flow input to the process flow information input area 1011 is stored into the process flow information 131.

When the analysis button 1014 is selected, the processing of steps 5701 to 5706 are executed, a graph showing a manufacturing line generated in step 5702 is displayed in the manufacturing line display area 1012, and further a logic selected in step 5705 is displayed in the logic display area 1021. Accordingly, the user can grasp the manufacturing line for manufacturing the products of all the items and the selected logic. When the detail display button 1022 is selected after the analysis button 1014 is selected, a detail display screen to be described later is displayed.

Figure 11:
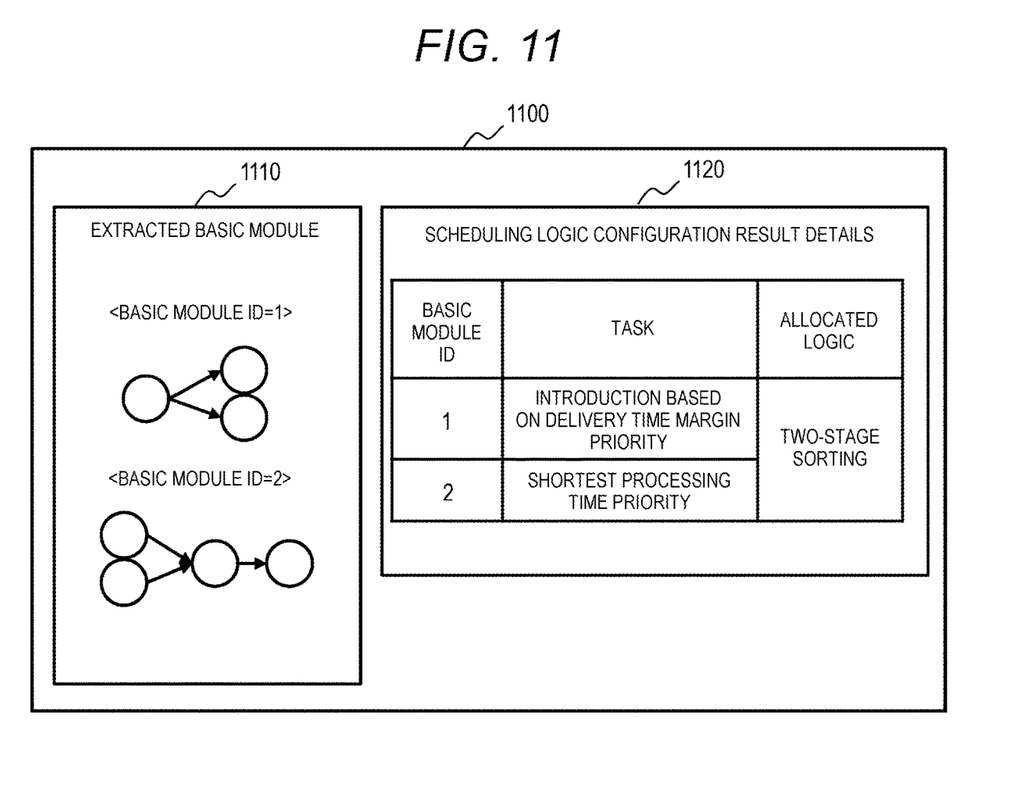
FIG. 11 is a diagram illustrating an example of a detail display screen displayed on the display device of the logic configuration apparatus according to the first embodiment.

FIG. 11 is a diagram illustrating an example of a detail display screen displayed on the display device 140 of the logic configuration apparatus 100. A detail display screen 1100 includes, for example, a basic module display area 1110 and a scheduling logic configuration result detail display area 1120. The detail display screen 1100 may be displayed on a display device provided in the production scheduling apparatus 200.

A basic module identified in step S703 is displayed in the basic module display area 1110. In the scheduling logic configuration result detail display area 1120, information of the scheduling logic configuration result information 135 is displayed.

As described above, the logic configuration apparatus 100 according to the present embodiment identifies a basic module included in a graph of a manufacturing line that is obtained by merging graphs indicating process flows of items, extracts a task corresponding to the identified basic module, and automatically selects a logic based on the extracted task.

Accordingly, the logic configuration apparatus 100 can appropriately determine a task and a logic corresponding to a manufacturing line for manufacturing a product of an item, without defining in advance tasks and logics corresponding to process flows of innumerable items and innumerable manufacturing lines and without referring to operation records of production scheduling for similar manufacturing lines. In addition, with the logic configuration apparatus 100 according to the present embodiment, a task and a logic corresponding to a manufacturing line for manufacturing a product of an item can be appropriately determined, even if an operator is not a skilled person in logic design of the production scheduling. In addition, the logic configuration apparatus 100 according to the present embodiment can associate a process flow with a logic depending on a task, and thus can improve the reusability of the logic.

The invention is not limited to the embodiment described above, and includes various modifications. For example, the embodiment described above has been described in detail for easy understanding of the invention, and the invention is not necessarily limited to those including all of the configurations described above. A part of a configuration according to one embodiment can be replaced with a configuration according to another embodiment, and a configuration according to one embodiment can be added to a configuration according to another embodiment. A part of a configuration according to one embodiment may be added, deleted, or replaced with another configuration.

A part or all of the above configurations, functions, processing units, processing methods and the like may be implemented by hardware by, for example, designing using an integrated circuit. The above configurations, functions, and the like may be implemented by software by interpreting and executing programs for implementing functions by the processor. Information such as a program, a table, and a file for implementing the functions can be stored in a recording device such as a memory, a hard disk, or a solid state drive (SSD), or in a recording medium such as an IC card, an SD card, or a DVD.

Control lines or information lines indicate what is considered necessary for description, and not all the control lines or information lines are necessarily shown for a product. In practice, it may be considered that almost all configurations are connected to each other.

What is claimed is:

1. An information processing apparatus comprising:
a processor; and
a memory, wherein
the memory stores
a graph showing a manufacturing line configured to manufacture a plurality of items,
task information indicating graphs showing basic modules and tasks of production scheduling, and
a rule for selecting a logic of the production scheduling based on the tasks, and
the processor
identifies graphs showing basic modules included in the graph showing the manufacturing line by referring to the task information,
extracts tasks corresponding to the identified graphs of the basic modules by referring to the task information, wherein the tasks include at least one of a delivery time margin priority and a processing time priority,
selects a logic corresponding to the extracted tasks by referring to the rule, and
outputs information indicating the selected logic.

2. The information processing apparatus according to claim 1, wherein
the memory stores process flow information indicating process flows for manufacturing the plurality of items, and
the processor
generates graphs showing the process flows of the plurality of items by referring to the process flow information, and
generates the graph showing the manufacturing line by merging the generated graphs showing the process flows of the plurality of items.

3. The information processing apparatus according to claim 1, wherein
the information processing apparatus is connected to an input device and a display device, and
the processor
displays the extracted tasks and the selected logic on the display device,
receives an input of a correct logic via the input device, and
learns the rule based on the extracted tasks and the correct logic when it is determined that the selected logic and the correct logic are different from each other.

4. The information processing apparatus according to claim 1, wherein
the processor generates data for outputting information indicating the graph showing the manufacturing line and the selected logic to a display device.

5. The information processing apparatus according to claim 1, wherein
the processor generates data for outputting information indicating the identified graphs of the basic modules and the extracted tasks to a display device.

6. An information processing system comprising:
a logic configuration apparatus; and
a production scheduling apparatus, wherein
the logic configuration apparatus stores
a graph showing a manufacturing line configured to manufacture a plurality of items,
task information indicating graphs showing basic modules and tasks of production scheduling,
a rule for selecting a logic of the production scheduling based on the tasks, and
implementation information indicating a specification of the production scheduling apparatus,
identifies graphs showing basic modules included in the graph showing the manufacturing line by referring to the task information,
extracts tasks corresponding to the identified graphs of the basic modules by referring to the task information, wherein the tasks include at least one of a delivery time margin priority and a processing time priority,
selects a logic corresponding to the extracted tasks by referring to the rule, and
generates, by referring to the specification indicated by the implementation information, implementation information for implementing information indicating the selected logic on the production scheduling apparatus, and
outputs the generated implementation information to the production scheduling apparatus, and
the production scheduling apparatus implements the logic based on the implementation information.

7. An information processing method to be executed by an information processing apparatus,
the information processing apparatus including a processor and a memory, the memory being configured to store
a graph showing a manufacturing line configured to manufacture a plurality of items,
task information indicating graphs showing basic modules and tasks of production scheduling, and
a rule for selecting a logic of the production scheduling based on the tasks,
the information processing method comprising:
the processor identifying graphs showing basic modules included in the graph showing the manufacturing line by referring to the task information;
the processor extracting tasks corresponding to the identified graphs of the basic modules by referring to the task information, wherein the tasks include at least one of a delivery time margin priority and a processing time priority;
the processor selecting a logic corresponding to the extracted tasks by referring to the rule; and
the processor outputting information indicating the selected logic.

8. The information processing method according to claim 7, the memory being configured to store process flow information indicating process flows for manufacturing the plurality of items,
the information processing method further comprising:
the processor generating graphs showing the process flows of the plurality of items by referring to the process flow information; and
the processor generating the graph showing the manufacturing line by merging the generated graphs showing the process flows of the plurality of items.

9. The information processing method according to claim 7, the information processing apparatus being connected to an input device and a display device,
the information processing method further comprising:
the processor displaying the extracted tasks and the selected logic on the display device;
the processor receiving an input of a correct logic via the input device; and the processor learning the rule based on the extracted tasks and the correct logic when it is determined that the selected logic and the correct logic are different from each other.

10. The information processing method according to claim 7, further comprising:

the processor generating data for outputting information indicating the graph showing the manufacturing line and the selected logic to a display device.

11. The information processing method according to claim 7, further comprising:

the processor generating data for outputting information indicating the identified graphs of the basic modules and the extracted tasks to a display device.

* * * * *